US012333483B2

(12) United States Patent
Okabe et al.

(10) Patent No.: US 12,333,483 B2
(45) Date of Patent: Jun. 17, 2025

(54) INFORMATION PROCESSING METHOD, INFORMATION PROCESSING DEVICE, PROGRAM PRODUCT FOR PROCESSING INFORMATION, AND PROGRAM PRODUCT FOR REFERRING TO HISTORY INFORMATION

(71) Applicant: DENSO CORPORATION, Kariya (JP)

(72) Inventors: Tatsuya Okabe, Kariya (JP); Yuka Tamura, Kariya (JP); Shintarou Hara, Kariya (JP); Takakazu Murakami, Kariya (JP)

(73) Assignee: DENSO CORPORATION, Kariya (JP)

( * ) Notice: Subject to any disclaimer, the term of this patent is extended or adjusted under 35 U.S.C. 154(b) by 74 days.

(21) Appl. No.: 17/806,641

(22) Filed: Jun. 13, 2022

(65) Prior Publication Data

US 2022/0309458 A1  Sep. 29, 2022

Related U.S. Application Data

(63) Continuation of application No. PCT/JP2020/044774, filed on Dec. 2, 2020.

(30) Foreign Application Priority Data

Dec. 16, 2019  (JP) .................................. 2019-226561

(51) Int. Cl.
*G06Q 10/083* (2024.01)
*G06Q 10/0833* (2023.01)
*G06Q 10/087* (2023.01)

(52) U.S. Cl.
CPC ..... *G06Q 10/0838* (2013.01); *G06Q 10/0833* (2013.01); *G06Q 10/087* (2013.01)

(58) Field of Classification Search
CPC ........... G06Q 10/0838; G06Q 10/0833; G06Q 10/087

(Continued)

(56) References Cited

U.S. PATENT DOCUMENTS 8,533,075 B1   9/2013   Sayers, III et al.
8,756,124 B1   6/2014   Sayers, III et al.
(Continued)

FOREIGN PATENT DOCUMENTS

CN    105023161 A     11/2015
JP    2003-242149 A    8/2003
(Continued)

OTHER PUBLICATIONS

"The Tag Duplication Problem in an Integrated WSN for RFID-Based Item-Level Inventory Monitoring" Published by IEEE (Year: 2008).*

*Primary Examiner* — Zeina Elchanti
(74) *Attorney, Agent, or Firm* — Maschoff Brennan (57) ABSTRACT

A method of processing information related to a distributed item includes generating attachment information and acquiring a reference request and requester information. The attachment information is associated with history information accumulated for the distributed item and is to be distributed along with the distributed item. The reference request is made for a reference to the history information using the attachment information attached to the distributed item. The requester information contains at least location data of a requester terminal that made the reference request.

16 Claims, 7 Drawing Sheets

(58) Field of Classification Search
USPC .......................................................... 705/341
See application file for complete search history.

(56) References Cited

U.S. PATENT DOCUMENTS

| | | | | |
|---|---|---|---|---|
| 2006/0004762 | A1* | 1/2006 | Berning | G16H 10/60 |
| | | | | 707/999.009 |
| 2010/0148935 | A1* | 6/2010 | Graf Von Reischach | ................... |
| | | | | H04L 9/30 |
| | | | | 340/10.5 |
| 2016/0148440 | A1* | 5/2016 | Kwak | G07C 5/085 |
| | | | | 701/31.5 |
| 2017/0109673 | A1* | 4/2017 | Bell | G05D 1/0011 |
| 2019/0180291 | A1* | 6/2019 | Schmeling | G16H 20/10 |
| 2022/0122026 | A1 | 4/2022 | Okabe et al. | |

FOREIGN PATENT DOCUMENTS

| | | |
|---|---|---|
| JP | 2013-228940 A | 11/2013 |
| JP | 2018-63628 A | 4/2018 |

* cited by examiner

INFORMATION PROCESSING METHOD, INFORMATION PROCESSING DEVICE, PROGRAM PRODUCT FOR PROCESSING INFORMATION, AND PROGRAM PRODUCT FOR REFERRING TO HISTORY INFORMATION

CROSS REFERENCE TO RELATED APPLICATION

The present application is a continuation application of International Patent Application No. PCT/JP2020/044774 filed on Dec. 2, 2020, which designated the U.S. and claims the benefit of priority from Japanese Patent Application No. 2019-226561 filed on Dec. 16, 2019. The entire disclosures of all of the above applications are incorporated herein by reference.

TECHNICAL FIELD

The present disclosure relates to technologies of information processing for distributed items.

BACKGROUND

In a known technology, a facility information request is transmitted from a search terminal to an information processing device when users use a facility search service. The facility information request contains a category of the facility to be searched and location data of the search terminal.

SUMMARY

A first aspect of the present disclosure is a method of processing information related to a distributed item. The method includes: generating, by at least one processor, attachment information that is associated with history information accumulated for the distributed item and is to be distributed along with the distributed item; and acquiring, by the at least one processor, (i) a reference request for a reference to the history information using the attachment information attached to the distributed item and (ii) requester information containing at least location data of a requester terminal that made the reference request.

A second aspect of the present disclosure is an information processing device configured to process information related to a distributed item. The information processing device includes: an information storage unit configured to store history information accumulated for the distributed item so as to be associated with attachment information that is generated to be distributed along with the distributed item; and a request acquiring unit configured to acquire (i) a reference request for a reference to the history information using the attachment information attached to the distributed item and (ii) requester information containing at least location data of a requester terminal that made the reference request.

A third aspect of the present disclosure is a computer program product for processing information related to a distributed item. The computer program product is stored on at least one non-transitory computer readable medium and includes instructions configured to, when executed by at least one processor, cause the processor to: acquire reference request for a reference to a history information of the distributed item using attachment information that is associated with the history information accumulated for the distributed item and is configured to be distributed along with the distributed item; and acquire, along with the reference request, requester information that contains at least location data of a requester terminal that made the reference request.

EMBODIMENTS

For example, a high need is expected to exist to determine the location of distributed items such as food, automobiles, and appliances after they have been distributed to the market. The collection of such location data for distributed items requires the cooperation of users of distributed items. However, it may be difficult to effectively collect the location data of the distributed items because users do not benefit from the collection of the location data compared with a case where the location data is collected in exchange for the provision of facility search services.

Figure 1:
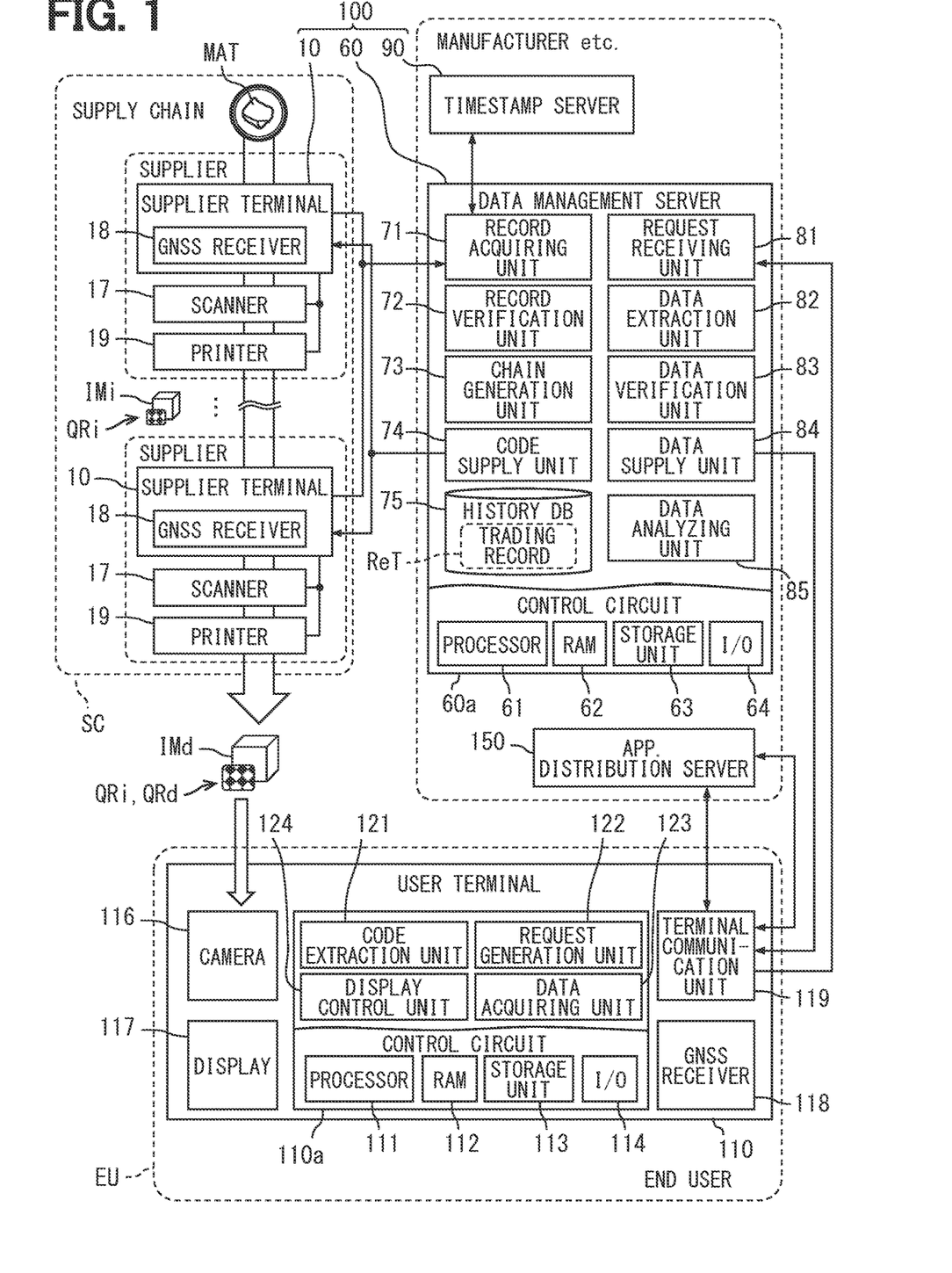
FIG. 1 is a diagram illustrating a supply chain management system according to an embodiment of the present disclosure.

A supply chain management system 100 of the present disclosure shown in FIG. 1 is configured to manage trading records ReT of an item traded between traders in a supply chain SC including multiple traders. In the supply chain management system 100, techniques of a blockchain are used to manage the trading record ReT for protecting the trading record ReT from tampering.

The supply chain SC is a connection between the traders for delivering, for example, industrial products, agricultural products, and marine products to end users (hereinafter, referred to as a user EU). For example, in the supply chain SC for delivering the industrial products to the user EU, the traders include material mining companies, material producing companies, processing companies, transport companies, and distribution companies. In this case, the supply chain SC from a raw material MAT to a final product is set up. The final product is delivered to the user EU as the distributed item IMd.

Figure 2:
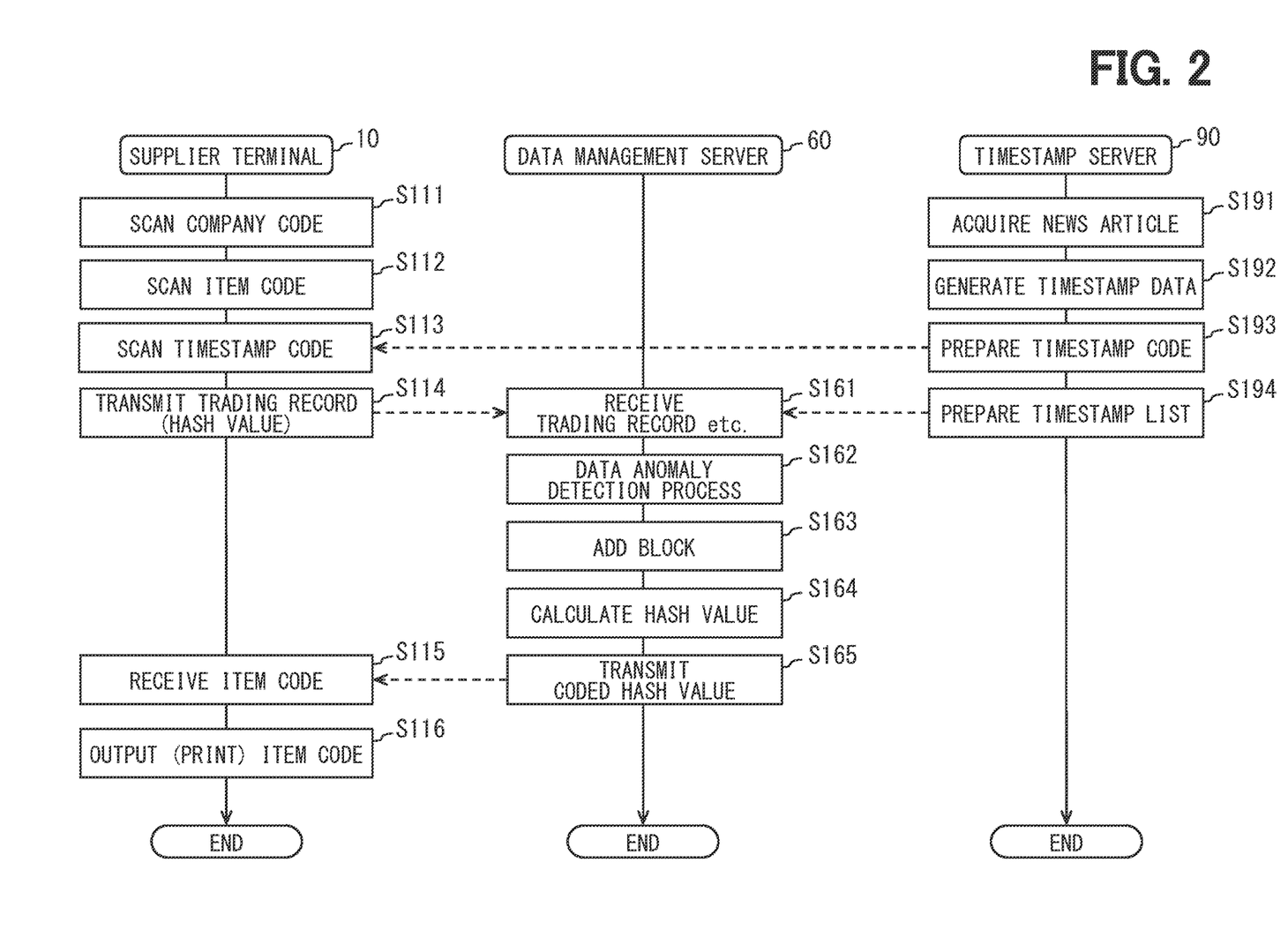
FIG. 2 is a sequence diagram illustrating a chain generation process performed by the supply chain management system.

The supply chain management system 100 includes multiple supplier devices 10, a timestamp server 90, and at least one data management server 60, as shown in FIGS. 1, 2. Each supplier device 10, the timestamp server 90, and the data management server 60 are connected with the network to communicate with each other. The supplier devices 10, the timestamp server 90, and the data management server 60 are configured to collect and accumulate the trading records ReT until the distributed item IMd is manufactured by performing a chain generation process (see FIG. 2).

At least one supplier terminal 10 is provided at each facility of the traders included in the supply chain SC, or the suppliers who provide parts, materials, or products. The supplier terminal 10 is used by workers in the facility of the supplier where the supplier terminal 10 is provided. The supplier terminal 10 is configured to transmit the delivered record of the incoming item to the data management server 60. In addition, the supplier terminal 10 is configured to receive from the data management server 60 attachment information attached to the item to be shipped. Specifically, item data, company data, and timestamp data are handled in the supplier terminal 10.

The item data is data attached to the item (hereinafter, incoming item IMi) delivered to the supplier and the distributed item IMd. The two-dimensional code (hereinafter, item code QRi) such as a QR code (registered trademark) in which the item data is recorded is printed on a paper medium or the like and is attached to the incoming item IMi and the distributed item IMd. The position to which the item code QRi is attached is not limited to the product itself, and may be any of packaging, certificates, or the like.

Figure 3:
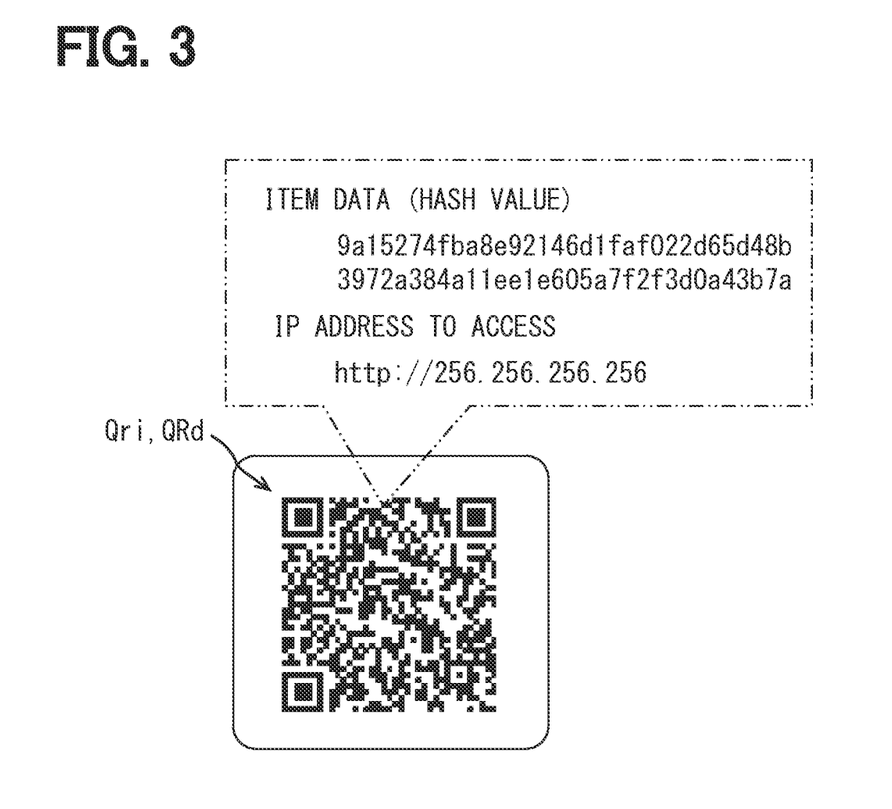
FIG. 3 is a diagram showing an example of a two-dimensional code attached to an item.

In the item code QRi, at least a hash value that is the item data associated with the trading record ReT, and an IP address of an inquiry destination of the trading record ReT (see FIG. 3). The hash value is generated using the last block of the blockchain and has constant bits. The data size of the item data can be suppressed by using the hash value as the item data. As a result, the item data is recorded in the item code QRi, and accordingly the item data can be distributed along with the incoming item IMi and the distributed item IMd. In the item code QRi, a URL for inquiring the trading record ReT may be recorded instead of the above-mentioned IP address.

The company data is identification data indicating the supplier. Each supplier is given unique company data by a certifier who manages the supply chain SC. The two-dimensional code (hereinafter, referred to as company code) such as QR code recording the company data is printed on a paper medium or the like and distributed in advance to each supplier. In the company code, a hash value associated with the supplier is recorded as the company data by the manager of the supply chain SC. The generation and the distribution of the company code may be carried out by the system supplier of the supply chain management system 100 instead of the manager of the supply chain SC.

As the item code QRi and the company code, a secure QR code (SQRC, registered trademark) configured to selectively disclose the recorded information by using the private key may be preferable. Further, as the item code QRi and the company code, anti-copy QR code which is difficult to be copied by a copier or the like by using a special ink may be preferable.

The timestamp data is used as data associated with the date and time when the incoming item IMi was at a specific supplier. The timestamp data is created by the timestamp server 90. A two-dimensional code (hereinafter, referred to as timestamp code) in which the hash value is recorded as the timestamp data is provided to each supplier as image data, for example.

The supplier terminal 10 is an electronic device having a computer function such as a smartphone, a tablet terminal, and a dedicated terminal. The supplier terminal 10 includes a GNSS (Global Navigation Satellite System) receiver 18. The supplier terminal 10 is electrically connected to a scanner 17 and a printer 19. The GNSS receiver 18 may be configured to be electrically connected to the supplier terminal 10. At least one of the scanner 17 and the printer 19 may be integrated with the supplier terminal 10.

The GNSS receiver 18 is configured to receive location signals transmitted from multiple satellites (positioning satellites) to identify the location where the supplier terminal 10 is being used. Location data of the supplier terminal 10 specified by the GNSS receiver 18 is included in the trading record ReT as history information indicating the location where the item is delivered. The location data includes at least values of the latitude and the longitude estimated from the location signal. The location data may further include a value of the altitude, for example.

The scanner 17 is configured to read the item data, the company data, the timestamp data, and the like recorded in the two-dimensional code. The scanner 17 includes an area sensor in which CCD elements are arranged two-dimensionally. The scanner 17 is configured to scan the two-dimensional code printed on a paper medium or the like and output the scanned information of the two-dimensional code to the supplier terminal 10.

The printer 19 is an output device configured to print, on a paper medium (sticker or the like), new item code QRi provided from the data management server 60. The item code QRi printed out by the printer 19 is attached to the outgoing item to be distributed to the next supplier.

The supplier terminal 10 is configured to extract, from the image data of the code read by the scanner 17, hash values associated with the item data, the company data, and the timestamp data (see S111-S113). The supplier terminal 10 is further configured to acquire the location data from the GNSS receiver 18. The supplier terminal 10 transmits the item data, the company data, the timestamp data, raw data of these data, the hash values of these data, and the location data as the trading record ReT to the data management server 60 (see S114).

The supplier terminal 10 receives image data of new item code QRi generated by the data management server 60 based on the transmitted trading record ReT (see S115). The supplier terminal 10 causes the printer 19 to output the received item code QRi (see S116).

The timestamp server 90 is a server device including a computer as a main component configured to generate the timestamp data that is provided to the supplier terminal 10. The timestamp server 90 is configured to acquire news articles distributed with information indicating the date and time from a news distribution server connected with the network on a daily or predetermined time basis (see S191). The timestamp server 90 is configured to generate input information in which the date information, a character string of the news article, and a character string specified in advance are combined in this order. The timestamp server 90 is configured to generate, as the timestamp data, the hash value having a predetermined number of bits (for example, 256 bits) by inputting the above-described input information into a hash function such as SHA-256. The timestamp server 90 is configured to store the calculated hash value, the date information, the news article, and the predetermined character string to a timestamp list as a set of data for search.

In response to a providing request from the other nodes such as the supplier terminal 10 and the data management server 60 to provide information related to the timestamp data, the timestamp server 90 performs a response process according to the content of the providing request. For example, the timestamp server 90 prepares the image data of the latest timestamp code, and sends the image data to the requester node in response to the providing request from the supplier terminal 10 as the response process (see S193). Further, in response to the providing request from the data management server 60, the data management server 90 searches the date information corresponding to the hash value or the hash value corresponding to the date information from the timestamp list. The timestamp server 90 returns the searched date information or hash value to the requester node as the response process (see S194).

The data management server 60 is a host node configured to communicate with multiple supplier terminals 10. The data management server 60 and the timestamp server 90 are under the control of the administrator of the supply chain SC. The administrator is, for example, a manufacture whose brand name is shown on the final product or a retailer who sells the final product to the user EU. The actual management of each of the servers 60 and 90 may be carried out by the system vendor of the supply chain management system 100 in the same manner as the distribution of the company code.

The data management server 60 is a server device having a control circuit 60*a* that functions as a computer. The data management server 60 functions as an information processing device configured to process information related to the distributed item IMd. The control circuit 60*a* includes a processor 61, RAM 62, a storage unit 63, an input/output interface 64, and a bus connecting these elements each other. The processor 61 is hardware coupled with the RAM 62 for arithmetic processing. The processor 61 is configured to access the RAM 62 to perform processes related to data management. The storage unit 63 stores supply chain management programs for the data management.

Specifically, the data management server 60 has a record generation function to accumulate the trading records ReT provided from multiple supplier terminals 10, a record reference function to provide the trading record ReT such that the trading record ReT can be referred to, and a data analysis function to analyze collected data related to the referred record. Hereinafter, the record generation function will be described in detail. The storage unit 63 stores, as one of the supply chain management programs, a record generation program for accumulating the trading records ReT. The data management server 60 has functional units such as a record acquiring unit 71, a record verification unit 72, a chain generation unit 73, and a code supply unit 74 based on the record generation program.

The record acquiring unit 71 is configured to acquire, as the trading record ReT, information transmitted from the supplier terminal 10 (see S161). The trading record ReT contains at least one item data, the company data, the timestamp data, and the location data. The record acquiring unit 71 acquires raw data of the item data, the company data, and the timestamp data generated in the predetermined format and the hash value generated from these data having the predetermined number of bits. The record acquiring unit 71 is configured to obtain a hash value of the location data by inputting the location data into a hash function such as SHA-256. The record acquiring unit 71 may acquire the timestamp data from the timestamp server 90 instead of from the supplier terminal 10. In this case, the record acquiring unit 71 receives the date information corresponding to the hash value from the timestamp server 90 by transmitting the hash value of the timestamp data to the timestamp server 90.

The record verification unit 72 performs a data anomaly detection process (see S162) to determine whether each data acquired by the record acquiring unit 71 is normal by comparing the acquired data with data registered in advance. The record verification unit 72 is configured to detect improper products, parts, raw materials MAT, and the like, which would be introduced by non-certified vendors into the supply chain SC.

Specifically, the record verification unit 72 checks whether the company data matches the legitimate value registered in the list, and whether the location data matches the registered location data of the supplier. Further, the record verification unit 72 checks whether the item data is a duplicate of the item data which has been acquired from another supplier, and whether the chronological order of the date information associated with the timestamp data is normal. The record verification unit 72 determines that an improper product may be introduced when at least one verified data includes an abnormal value. In this case, a value indicating an error is transmitted to the supplier terminal 10, for example. In contrast, when an anomaly is not detected in each data, the record verification unit 72 determines that the incoming item IMi is a legitimate item.

The chain generation unit 73 is configured to accumulate the item data, the company data, the timestamp data, and the location data acquired by the record acquiring unit 71 in a tamper-proof state using a blockchain technology. Specifically, the chain generation unit 73 is configured to prepare hash values of the item data, the company data, the timestamp data, and the location data of all incoming items IMi related to the outgoing item. The chain generation unit 73 is configured to perform an adding process (see S163) to add a block, which contains these data (hash values), to the blockchain.

In addition, the chain generation unit 73 calculates the hash value of the last block of the blockchain to acquire the hash value as new item data (see S164). As a result, the item data associated with the past trading records ReT is generated. Further, the hash value calculated as the item data is added to the header of next block, for example.

The chain generation unit 73 repeats the calculation of the hash value reflecting the distribution channel up to that point as the transaction of the item between suppliers in the supply chain SC progresses. As a result, the hash value provided as the item data is the value (Merkle root) reflecting the past distribution channel of the item. When the distributed item IMd that is the final product is in the hands of the user EU, all of the accumulated trading records ReT of the distributed item IMd are stored on the blockchain so as to be associated with the item data.

The chain generation unit 73 is configured to store the blockchain containing the trading records ReT to the history database 75. The history database 75 is a storage space in the storage unit 63. The raw data of the item data and the company data acquired as the trading record ReT is accumulated in the history database 75.

The chain generation unit 73 records the outgoing item to which the new hash value is attached as an unused item. As a result, the current outgoing item is registered as UTXO (Unspent Transaction Output) in the blockchain. When the unused item registered as the UTXO is registered by the supplier at the next step, the chain generation unit 73 changes the status of the item to a used status. As a result, the number of the items shipped by the previous suppliers and the number of the incoming items received by the next supplier are constantly monitored by the data management server 60.

The trading record ReT may be accumulated on another storage unit other than the blockchain (private chain) provided in the history database 75. The chain generation unit 73 may store at least a part of the trading records ReT on the blockchain (public chain) outside the data management server 60.

The code supply unit 74 is configured to provide the hash value of the last block calculated by the chain generation unit 73 to the supplier terminal 10 which transmitted the trading record ReT. The code supply unit 74 is configured to generate a two-dimensional code, as new item code QRi, containing at least the hash value. The code supply unit 74 is configured to transmit the image data of the item code QRi to the supplier terminal 10 (see S165).

Next, the record reference function of the data management server 60 will be described. The data management server 60 is configured to perform a reference process (see FIG. 4) in cooperation with the user terminal 110 to allow the user EU to refer to the trading record ReT. Specifically, the user EU can refer to the trading record ReT that is the history information about the distributed item IMd by scanning by the user terminal 110 the item code QRi of the distributed item IMd (hereinafter, a distributed item code QRd) that is distributed as the final product. Functions of the data management server 60 and the user terminal 110 related to the reference to the trading record ReT of the distributed item IMd will be described below.

The data management server 60 is configured to allow to refer the trading record ReT of the incoming item IMi in addition to the trading record ReT of the distributed item IMd. In this case, the worker of the supplier and the like can refer to the trading record ReT of the incoming item IMi by scanning the item code QRi of the incoming item IMi by the supplier terminal 10. That is, the supplier terminal 10 is configured to function as the user terminal 110. Accordingly, the distributed item IMd, the distributed item code QRd, and the user terminal 110 may be read as the incoming item IMi, the item code QRi, and the supplier terminal 10.

In the storage unit 63 of the data management server 60, a record reference program for realizing the record reference function is stored as one of the supply chain management programs. The data management server 60 has functional units such as a request receiving unit 81, a data extraction unit 82, a data verification unit 83, and a data supply unit 84 based on the execution of the record reference program by the processor 61.

The request receiving unit 81 is configured to acquire the reference request transmitted from the user terminal 110 and the item data of the distributed item IMd. In addition, in response to the reference request of the trading record ReT using the item data, the request receiving unit 81 acquires the user information of the user EU as the requester information from the user terminal 110 which transmitted the reference request. The user information includes at least the location data of the user terminal 110. Further, the user information includes the profile information of the user EU, e.g. age, gender, family structure, place of residence, and the like. The user information may include the time when the user purchased the distributed item IMd, the purchase price, a store where the user purchased the distributed item IMd, and the like. The request receiving unit 81 acquires, as the user information, allowed data that is allowed by the user EU to be provided among the data that can be provided from the user terminal 110.

The data extraction unit 82 is configured to refer to the blockchain stored in the history database 75 to identify the trading records ReT related to the item data acquired by the request receiving unit 81. Specifically, the data extraction unit 82 searches, from the trading records ReT accumulated in the history database 75, the trading record ReT of the distributed item IMd which corresponds to the hash value transmitted from the user terminal 110. The data extraction unit 82 is configured to extract, from the history database 75, main-body data of the trading record ReT associated with the hash value, i.e. information such as the name of the supplier (factory, line, or the like), date and time, and the name of the item. The data extraction unit 82 may be configured to acquire the information of date and time by requesting the timestamp server 90. The data extraction unit 82 is configured to generate the providing data by arranging the main-body data based on the structure of the Merkle tree of the hash values of the blockchain.

In the providing data, the trading record ReT in the later step is arranged in an upper layer, and the trading record ReT in the earlier step is arranged in a lower layer, for example. In another example, the data extraction unit 82 may arrange the trading record ReT in the earlier step in the upper layer, and the trading record ReT in the later step in the lower layer. The data extraction unit 82 may change the data structure of the providing data depending on the instruction from the reference requester, the usage of the trading record ReT, and the like.

Figure 4:
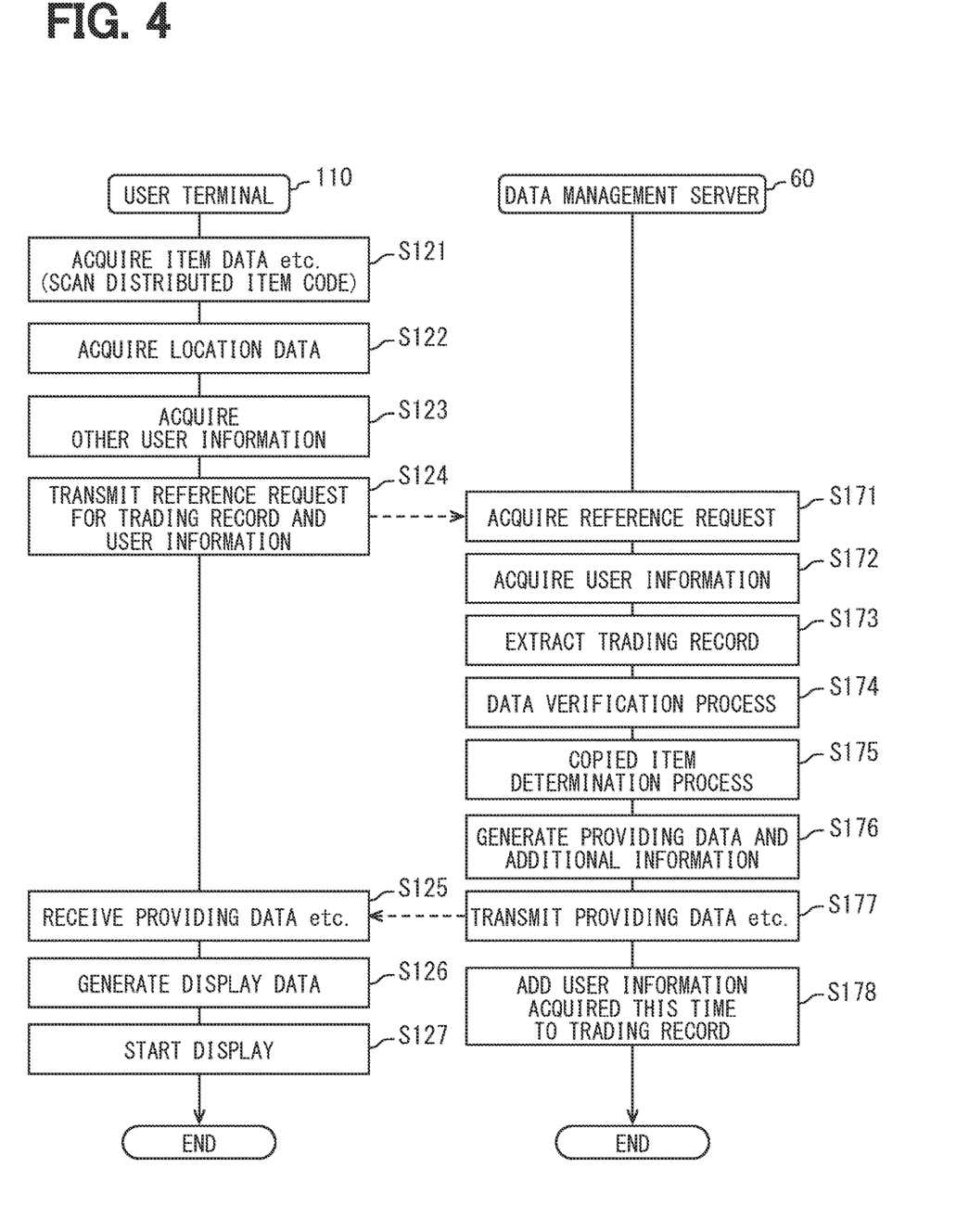
FIG. 4 is a sequence diagram illustrating a reference process performed by cooperation of a data management server and a user terminal.

The data verification unit 83 is configured to perform a data verification process to determine whether the trading record ReT extracted by the data extraction unit 82 is tampered (see S174 in FIG. 4). The data verification unit 83 is configured to repeatedly calculate the Merkle root by combining the hash values that are the trading records ReT based on the shape of the Merkle tree. When the hash value acquired as the item data by the request receiving unit 81 is identical with the hash value calculated from the trading records ReT, the data verification unit 83 determines that no trading record is tampered. In contrast, when the hash values are not identical, the data verification unit 83 determines that the trading record ReT may be tampered.

Figure 5:
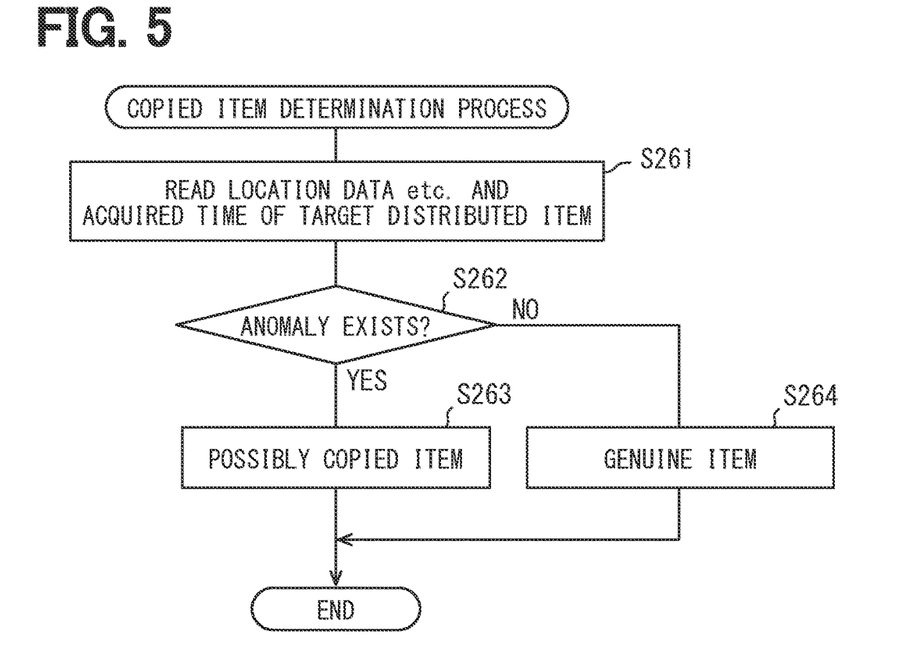
FIG. 5 is a flowchart illustrating details of a copied item determination process performed by the data management server.

In addition, the data verification unit 83 detects the copied item of the distributed item IMd by the copied item determination process (see S175 in FIG. 4 and FIG. 5). Specifically, the copied item may be reproduced in large numbers from a single distributed item IMd (hereinafter, specific distributed item) distributed in the market. Accordingly, the distributed item code QRd attached to each of the copied items is estimated to be identical to the distributed item code QRd attached to the legitimate distributed item. Accordingly, the data verification unit 83 detects the copied items made from the specific distributed item based on the user information acquired with the reference requests.

Specifically, in the copied item determination process (see FIG. 5), the data verification unit 83 read out the location data acquired and the acquired time, which are acquired in response to the reference request for the specific distributed item, from the data accumulated in the history database 75 in association with each other (see S261). The data verification unit 83 reads out the location data acquired in a specific time such as past few hours and past few days. In addition to the location data, the user information that identifies the user terminal 110 may be acquired from the history database 75.

The data verification unit 83 determines whether the location data and the acquired time contain an abnormal value (see S262). Specifically, when multiple copied items are distributed, the reference requests from different requesters, that is, the reference requests having different location data are simultaneously transmitted to the data management server 60. Accordingly, the data verification unit 83 determines that there is an anomaly when the number of the reference requests received in a predetermined time from different requesters, which is determined based on the location data, is at or above a threshold value. In this anomaly determination, the threshold value for determining whether the requesters are different, the predetermined time, and the threshold value of the number of the reference requests may be changeable. For example, the threshold values may be changed based on the number of the authenticate items to which the same distributed item code QRd is attached, the country or the region where the distributed item IMd is sold.

When the data verification unit 83 determines that there is an anomaly, the data verification unit 83 determines that the distributed item IMd (specific distributed item) may be possibly a copied item (see S263). In contrast, when it is determined that there is not an anomaly, the data verification unit 83 determines that the distributed item IMd is the authenticate item (S264).

When the data verification unit 83 determines that the trading record ReT may be tampered, the data supply unit 84 transmits a value indicating an error to the user terminal 110. When the data verification unit 83 determines that there may be the copied item, the data supply unit 84 transmits a value indicating an occurrence of the copied item to the user terminal 110. In contrast, when the data verification unit 83 determines that the trading record ReT is not tampered, the data supply unit 84 transmits the providing data generated by the data extraction unit 82 to the user terminal 110. Even when the data verification unit 83 determines that the distributed item IMd may be a copied item, the data supply unit 84 transmits the providing data generated by the data extraction unit 82 to the user terminal 110.

The data supply unit 84 provides the supplemental information related to the distributed item IMd to which the item data is attached in addition to the providing data including the trading record ReT specified from the item data to the user terminal 110 which made the reference request, as the response to the reference request. The supplemental information is information related to the distributed item IMd. Specifically, the supplemental information is, for example, a message to the user EU or points which can be exchanged for goods or services.

The data supply unit 84 changes the contents of the supplemental information that is provided to the user terminal 110 depending on the contents of the item data and the user information. For example, the data supply unit 84 can grasp the model number and the like of the distributed item IMd from the item data. In this case, the data supply unit 84 sends information on recalls and service campaigns to the user terminal 110 as a message based on the model number information. When the distributed item IMd is an electronic device, the data supply unit 84 can grasp the product information such as software version in addition to the item data. In this case, the data supply unit 84 transmits a URL for informing the update to the user terminal 110 as a message based on the software version. The data supply unit 84 sets points based on the contents of the user information. Specifically, the data supply unit 84 gives more points to the user EU who provides more user information or rare user information.

The user terminal 110 functions as a history reference device configured to scan the distributed item code QRd attached to the distributed item IMd such as the final product and display past trading records ReT indicating the distribution channel. For example, the smartphone, the tablet terminal, the laptop computer or the like of the user EU is used as the user terminal 110. The user terminal 110 includes a camera 116, a display 117, a GNSS receiver 118, a terminal communication unit 119, and the above-described control circuit 110*a*.

The camera 116 is configured to generate the captured data of the distributed item code QRd attached to the distributed item IMd or the incoming item IMi, and provide it to the control circuit 110*a*. The display 117 is a display device including a liquid crystal panel, an organic EL panel, and the like. The display 117 is configured to display various screens by the control of the control circuit 110*a*. The display 117 has a touch panel function to accept user operations.

The GNSS receiver 118 has the same configurations as the GNSS receiver 18 of the supplier terminal 10 to specify the place where the user terminal 110 is used by receiving the locating signal. The location data of the user terminal 110 specified by the GNSS receiver 118 is sequentially output to the control circuit 110*a*. The location data of the user terminal 110 is information indicating the current position of the distributed item IMd. The location data includes at least values of the latitude and the longitude estimated from the location signal.

The terminal communication unit 119 is configured to perform a moving body communication conforming the wide area wireless communication standards such as LTE and 5G or Wi-Fi (registered trademark). The terminal communication unit 119 is configured to share the information between the user terminal 110 and the data management server 60 through the network.

The control circuit 110*a* mainly includes a computer equipped with a processor 111, RAM 112, a storage unit 113, an input/output interface 114, a bus connecting these elements, and the like to perform computing process. The processor 111 is hardware for arithmetic processing combined with the RAM 112. The storage unit 113 stores a history reference program for allowing the reference to the trading records ReT of the distributed item IMd accumulated in the data management server 60.

The history reference program is an application program (hereinafter, referred to as a traceability checker application) distributed through the network. The traceability checker application is downloaded from the application distribution server 150 to the storage unit 113 of the user terminal 110 through the network. The traceability checker application is automatically installed on the user terminal 110 after the download is completed.

The application distribution server 150 is a server device managed by the administrator of the supply chain SC in the same manner as the data management server 60 and the timestamp server 90. The application distribution server 150 may be a server device managed by a vendor of the operating system of the user terminal 110. In addition, the IP address or the URL of the application distribution server 150 may be recorded in the distributed item code QRd.

The user terminal 110 performs a providing data setting process (see FIG. 6) based on the traceability checker application at the first activation of the traceability checker application. The user terminal 110 displays a selection screen on the display 117 for selecting the data allowed to provide to the data management server 60 (see S211). On the selection screen, items such as the location data, age, gender, and the like are displayed in a list. The user EU selects whether the user EU allows it to be provided to the data management server 60 for each item of the user information including the location data. When the user EU inputs the tap operation for completing the setting (see S212), the allowed data that is allowed to be provided is set based on the contents input on the selection screen.

The user terminal 110 has on the control circuit 110a functional units such as a code extraction unit 121, a request transmission unit 122, a data receiving unit 123, and a display control unit 124 based on the traceability checker application.

The code extraction unit 121 is configured to acquire the captured data of the distributed item code QRd from the camera 116. The code extraction unit 121 is configured to obtain the item data that is the hash value recorded in the distributed item code QRd by analyzing the captured data.

Figure 6:
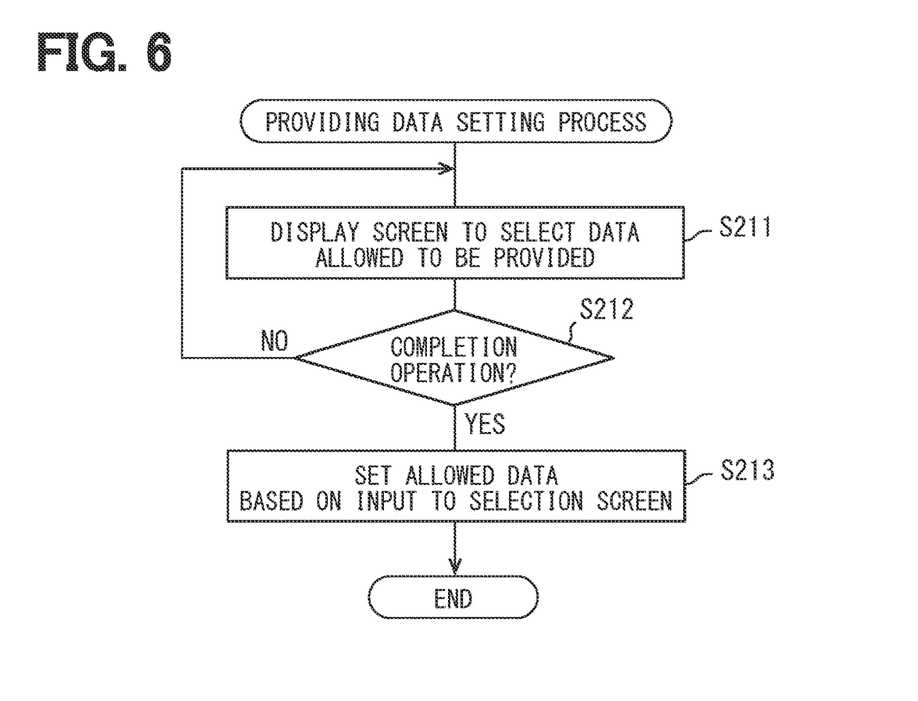
FIG. 6 is a flow chart illustrating details of provided data setting process executed by the user terminal.

The request transmission unit 122 prepares the item data acquired by the code extraction unit 121 and the allowed data selected in the providing data setting process (see FIG. 6). When no data is set as the allowed data, the request transmission unit 122 prepares only the item data. The request transmission unit 122 is configured to transmit the user information containing the allowed data and the item data to the data management server 60 along with the reference request of the trading record ReT.

The data receiving unit 123 is configured to receive the providing data returned from the data management server 60 in response to the reference request from the request transmission unit 122. The providing data contains the trading record ReT related to the distributed item IMd. In addition, the data receiving unit 123 receives the supplemental information containing the message, the points, and the like related to the distributed item IMd.

The display control unit 124 is a functional unit configured to control the content displayed on the display 117. The display control unit 124 is configured to generate display data using the providing data received by the data receiving unit 123, and display the trading record ReT on the display 117. The display control unit 124 is configured to display a GUI screen 130 (see FIG. 7) for inquiring and presenting the trading record ReT based on the traceability checker application. The display control unit 124 is configured to transition the GUI screen 130 based on the user operation and the communication with the data management server 60.

Figure 7:
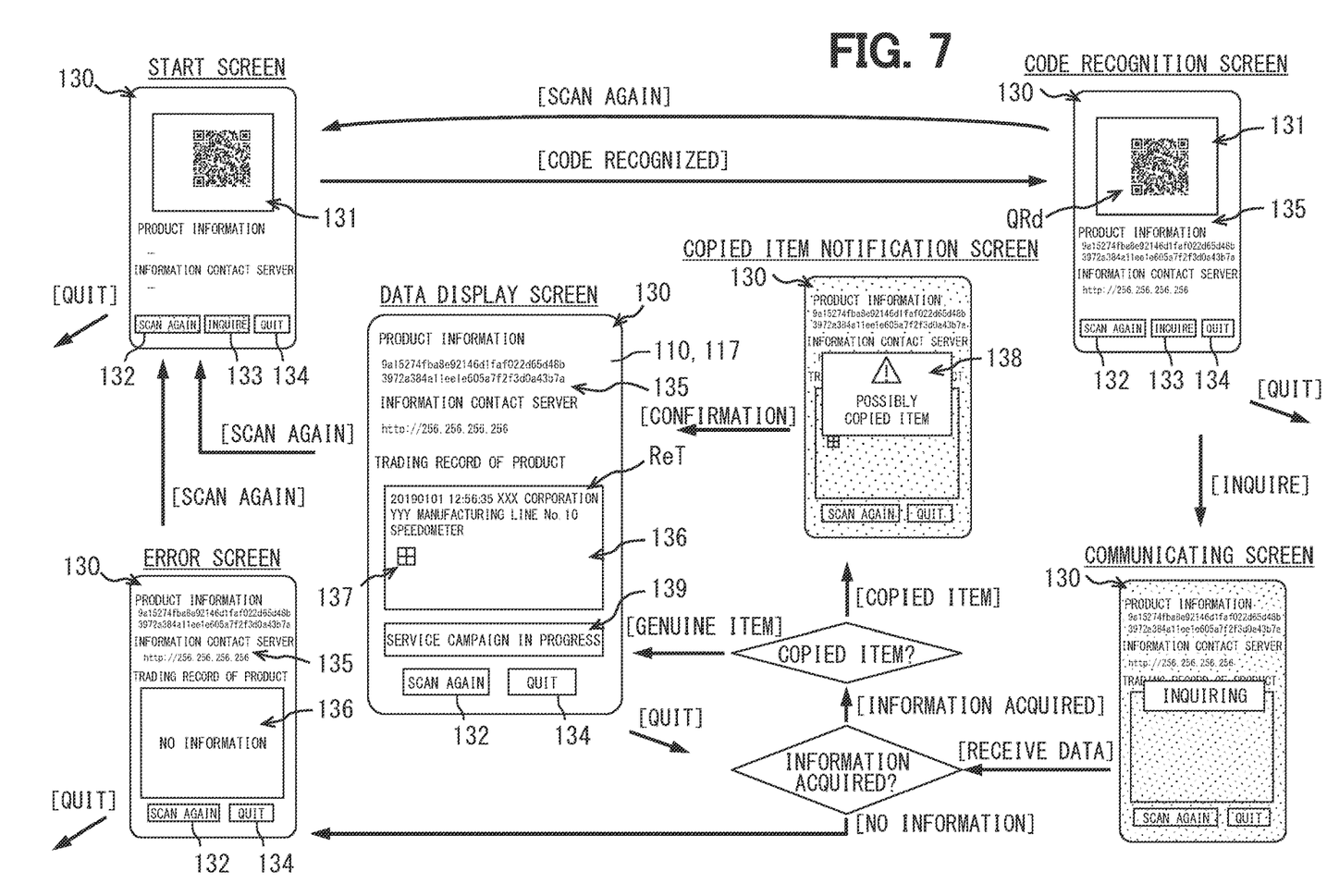
FIG. 7 is a diagram illustrating screen transitions of a GUI screen displayed on the user terminal by a traceability checker application.

The display control unit 124 is configured to display a start screen as the GUI screen 130 when the traceability checker application is activated by the tap operation of the user EU. In the start screen, a code recognition region 131 and multiple tap icons such as a rescan button 132, an inquiry button 133, and a quit button 134 are displayed. The code recognition region 131 is a display region in which the captured data by the camera 116 is displayed. When the user terminal 110 is moved such that the item code QRi is displayed in the code recognition region 131, the item code QRi is recognized by the code extraction unit 121. As a result, the GUI screen 130 transitions from the start screen to a code recognition screen.

In the code recognition screen, a code information display region 135 is displayed in addition to the code recognition region 131 and the tap icons. In the code information display region 135, the hash value that is the item data and IP address or URL of a contact server are displayed as the information read from the item code QRi. When the tap operation on the inquiry button 133 is input under such a state, the GUI screen 130 transitions from the code recognition screen to a communicating screen.

On the communicating screen, a message such as "INQUIRING" is displayed. When the error is returned as a result of the inquiry to the data management server 60, the GUI screen 130 transitions from the communicating screen to an error screen. On the error screen, an acquired information display region 136 is provided in addition to the code information display region 135, the rescan button 132, and the quit button 134. On the error screen, a message such as "NO INFORMATION. PLEASE CONTACT THE MANUFACTURER." is displayed in the acquired information display region 136.

In contrast, when the providing data is returned as a result of the inquiry to the data management server 60 and it is determined that the item is not a copied item, the GUI screen 130 transitions from the communicating screen to a data display screen. In the data display screen, the code information display region 135, the rescan button 132, the quit button 134, the acquired information display region 136, and the message region 139 are provided similarly to the error screen.

The trading records ReT related to the distributed item IMd are displayed in a hierarchical manner in chronological order in the acquired information display region 136. In an initial state, the trading record ReT of the supplier who lastly shipped the distributed item IMd is displayed first among multiple trading records ReT contained in the providing data in the acquired information display region 136. When the expansion button 137 is tapped in this state, the trading records ReT in the previous steps are sequentially displayed.

In the message region 139, messages based on the supplemental information acquired with the providing data are displayed. For example, when information about a service campaign is acquired as the supplemental information, the user EU is guided to the service campaign by the message region 139. In this case, a message such as "SERVICE CAMPAIGN IN PROGRESS" is displayed in the message region 139. When the message region 139 is tapped, the access to the web page guiding the service campaign is executed. When points are awarded, information on the points obtained is displayed in the message region 139.

In contrast, when a notification of a possible copied item is acquired along with the providing data, the GUI screen 130 transitions from the communicating screen to the copied item notification screen. In the copied item notification screen, the copy warning window 138 is superimposed on the grayed-down data display screen. In the copy warning window 138, a message such as "POSSIBLY COPIED ITEM" is displayed. When the copy warning window 138 is tapped and the message for the copied item is confirmed, the GUI screen 130 transitions from the copied item notification screen to the normal data display screen.

The reference process for the trading record ReT performed in cooperation of the data management server 60 and the user terminal 110 will be further described based on the sequence diagram shown in FIG. 4 with reference to FIG. 1.

In S121 performed by the user terminal 110, the IP address and the item data recorded in the distributed item code QRd are acquired by scanning the distributed item code QRd attached to the distributed item IMd. In S122, the location data of the user terminal 110 measured by the GNSS receiver 118 is acquired, and then the process proceeds to S123. In S123, the other user information set as the allowed data is acquired, and the process proceeds to S124. In S124, the reference request for the trading record ReT using the item data and the user information are transmitted to the data management server 60 identified by the IP address acquired in S121. The order of steps S121-S123 may be changed as appropriate.

In step S171 performed by the data management server 60, the reference request transmitted by the user terminal 110 in step S124 is received, and the process proceeds to step S172. In S172, in connection with the acquisition of the reference request, the user information including at least the location data of the user terminal 110 which transmitted the reference request is acquired, and the process proceeds to S173. In S173, the trading records ReT associated with the item data are extracted from the history database 75 based on the item data acquired in S171, and the process proceeds to S174.

In S174, the data verification process for the trading records ReT extracted in S173 is performed, and it is confirmed that the trading records ReT are not tampered, and then the process proceeds to S175. In S175, the copied item determination process (see FIG. 5) for the distributed item IMd is performed using the item data and the location data acquired in S171, S172, and it is confirmed that the copied item is not produced, and then the process proceeds to S176. When it is determined that the data may possibly be tampered in S174, a value indicating an error is transmitted to the user terminal 110, and then the reference process ends. When it is determined that the item may be a copied item in S175, a value indicating the possibility of the copied item is transmitted to the user terminal 110 along with the providing data.

In S176, the providing data is generated using the trading record ReT extracted in S173. Further in S176, the supplemental information including contents based on the item data and the user information acquired in S171, S172 is generated, and then the process proceeds to S177. In S177, the providing data and the supplemental information generated in S176 is transmitted to the user terminal 110 which has transmitted the reference request, and then the process proceeds to S178. In S178, the user information such as the location data acquired this time is added to the accumulated trading records ReT as new trading record ReT. When the item may possibly be a copied item, the location data and the like acquired this time are stored in another status than the authenticate item as copied item information, for example.

In step S125 performed by the user terminal 110, the providing data and the like returned from the data management server 60 in S177 is received, and the process proceeds to S126. In S125, the trading record ReT requested in S124 and the supplemental information are acquired. In S126, the display data to be displayed on the display 117 is generated based on the trading record ReT and the supplemental information acquired in S125, and the process proceeds to S127. In S127, the display of the display data (see FIG. 7) generated in S126 is started.

Next, the data analysis function of the data management server 60 will be described. The data management server 60 is configured to process the user information such as the location data collected from the user terminal 110 related to the reference request, and use it for purposes other than the history reference. In the storage unit 63 of the data management server 60, a data analysis program for realizing the data analysis function is stored as one of the supply chain management programs. The data management server 60 has a data analyzing unit 85 based on the execution of the item tracking program by the processor 61.

The data analyzing unit 85 is configured to use the location data acquired along with the reference request to visualize the movement of the distributed item IMd after it has been distributed to the market. Specifically, the data analyzing unit 85 generates business region data Mta visualizing a business region of the distributed item IMd by the item tracking process (see FIG. 8). The data analyzing unit 85 sets the range of distributed items IMd to be analyzed. For example, the item (hereinafter, distributed item IMd of a specific type) to be analyzed is selected based on a selection condition such as items sold at a specific store, items produced at a specific factory, items produced during a specific period, and the like (see S361). Multiple selection conditions above may be combined with each other.

Figure 8:
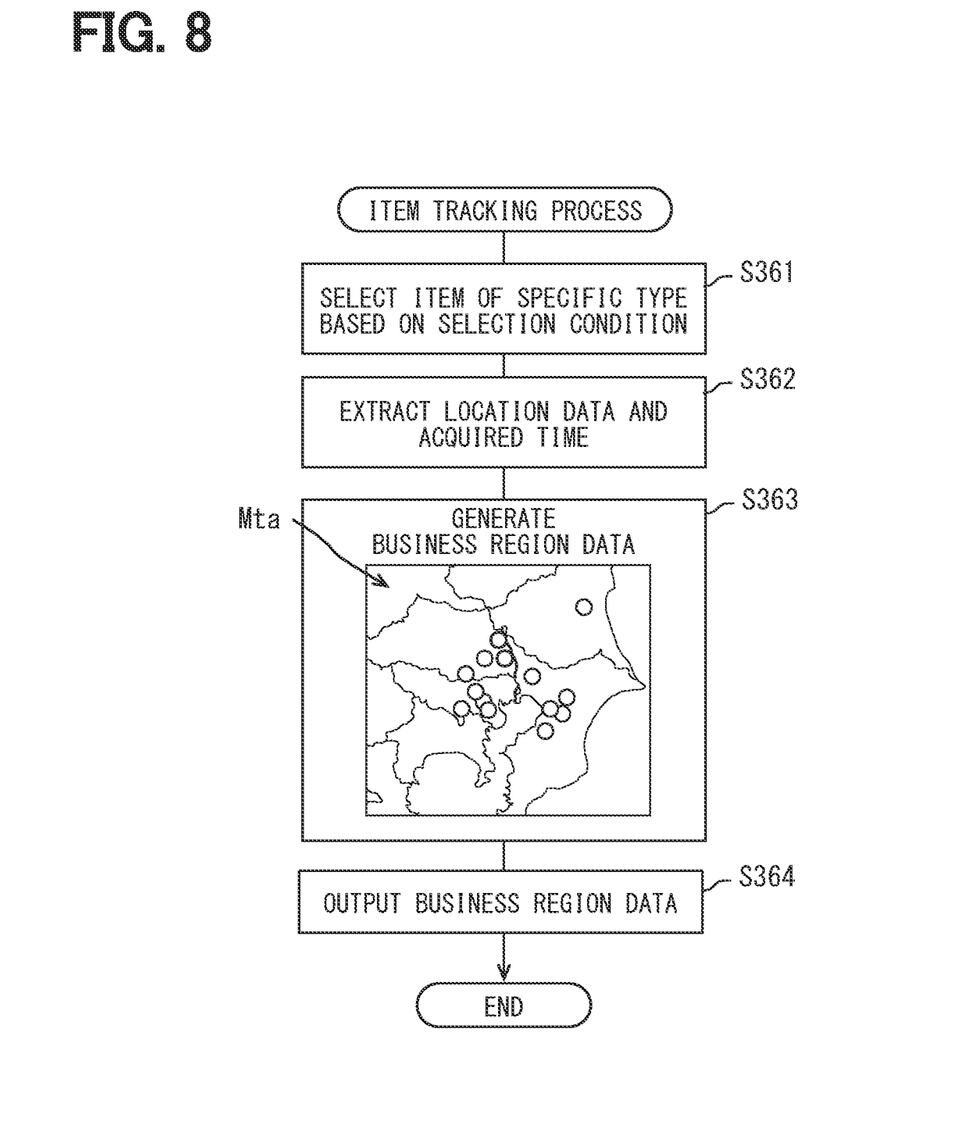
FIG. 8 is a flowchart illustrating details of an item tracking process performed by the data management server.

The data analyzing unit 85 extracts the location data associated with the distributed item IMd of the specific type the acquired time from the history database 75 (see S362). The data analyzing unit 85 generates, for the distributed item IMd of the specific type, business region data Mta (see S363). In the business region data, the location data associated with the acquired time is arranged on map data centered on a store or a factory where the distributed item IMd comes from. The business region data Mta is image data or video data consisting mainly of map data, and shows the distribution area of the distributed item IMd of the specific type in chronological order. The data analyzing unit 85 outputs the generated business region data Mta to a display device or an external electronic device (see S364).

According to the present embodiment described above, the location data that indicates the current position of the distributed item IMd is acquired along with the reference request for the trading record ReT. Since the trading records ReT accumulated for the distributed item IMd are provided for the benefit of the user EU, the location data can be collected effectively. As a result, even after the distributed item IMd is distributed, the location of the distributed item IMd can be continuously grasped.

Further in the present embodiment, the supplemental information related to the distributed item IMd is provided to the user terminal 110 as the response to the reference request in addition to the trading record ReT identified from the item data. Accordingly, the user EU who requested to refer to the trading record ReT can get messages or points in addition to the trading records ReT. Since the benefits for the user EU are expanded by providing the supplemental information, the location data can be collected more effectively.

Further in the present embodiment, the contents of the supplemental information to be provided to the user terminal 110 are changed based on the contents of the user information provided from the user terminal 110. According to the above, more attractive supplemental information is provided to the user EU who provided other useful user information in addition to the location data. As a result, the market information that can be used for marketing related to the distributed item IMd can be collected effectively in addition to the location data.

Further in the present embodiment, it is determined whether the copied item was produced based on the location data related to the specific distributed item. As described above, an increase in number of the specific distributed item can be observed by continuously monitoring the location of the specific distributed item. Since the product of the copied item is determined based on such an event, the product of the copied item can be grasped quickly, and the copied item can be removed from the market quickly. In addition, it will be possible to conduct appropriate educational activities for users EU to refrain from using copied products.

Further in the present embodiment, it is determined that the copied item is produced when the number of the acquired reference request along with different location data is at or above the threshold value within the predetermined time. According to this, the fact that multiple copied items are reproduced from one distributed item IMd can be detected with high certainty.

Moreover, the user terminal 110 provides, to the data management server 60 as the user information, only the allowed data that the user EU allowed to be provided among the data that can be provided to the data management server 60. Since the right to select the allowed data belongs to the user EU, the concern of the user EU regarding the leakage of personal information can be suppressed. According to the above, the mental barrier for the user EU to the use of the traceability checker application can be removed, and accordingly the user EU can be encouraged to provide the location data and the like.

Further in the present embodiment, the business region data Mta indicating the distribution area of the distributed item IMd of the specific type is generated using location data collected along with the reference requests. According to the business region data Mta, the information about the position where the item currently is, the information about the distribution channel of the item, and the information about how fast the item is distributed can be easily grasped. Thus, the added value of location data could be enhanced if the business region data Mta visualizes the transition of the location of distributed items IMd. Since the value is added to the location data, the benefits provided to the user EU as the supplemental information can be increased. As a result, the location data can be collected more effectively.

Further in the present embodiment, the location data acquired along with the reference request is added, as new history information, to the trading records ReT of the distributed item IMd for which the reference request was made. Accordingly, the history information of the distributed item IMd can be continuously accumulated even after the distributed item IMd is distributed. According to the above, the history information of the distributed item IMd is beneficial to the user EU even after the distributed item IMd is distributed to the market. As a result, the user is likely to make the reference request for the history information, and the location data can be collected effectively.

Further in the present embodiment, the trading record ReT related to the distributed item IMd is stored using the blockchain. Accordingly, the trading records ReT substantially cannot be tampered. Accordingly, the reliability of the trading record ReT can be ensured, and the value of the trading record ReT to the user EU can be improved. As a result, the user EU is encouraged to make the reference request, and the location data can be collection effectively.

In the above-described embodiment, the distributed item IMd corresponds to the distributed item, and the trading record ReT corresponds to the history information. The data management server 60 corresponds to the data management device and the information processing device, and the record reference program corresponds to the information processing program. Further, the chain generation unit 73 corresponds to the information storage unit, the user terminal 110 corresponds to the requester terminal, and the control circuits 60a, 110a correspond to the computer. The item data corresponds to the attachment information, and the user information corresponds to the requester information.

Other Embodiments

Although one embodiment of the present disclosure has been described above, the present disclosure is not construed as being limited to the above-described embodiments, and can be applied to various embodiments and combinations within a scope that does not depart from the spirit of the present disclosure.

In a first modification example of the above-described embodiment, the item data is attached to the incoming item IMi using RFID (radio frequency identifier) technique. In the first modification example, an RFID tag is used as the data recording medium attached to the incoming item IMi instead of the paper medium on which the two-dimensional code is printed. When the RFID is used, the scanner 17 of the supplier terminal 10 is configured to read the item data recorded in the RFID tag by short-range wireless communication. In addition, the supplier terminal 10 is connected to a writer configured to rewrite the information recorded in the RFID tag instead of the printer 19. The code output unit 24 of the supplier terminal 10 records, using the writer, new hash value received by the code receiving unit 23 from the data management server 60 to the RFID tag attached to the outgoing item.

In the first modification example, an RFID tag is used as the data recording medium attached to the distributed item IMd instead of the paper medium on which the two-dimensional code is printed. The user terminal 110 is connected to a reader or the like configured to read an RFID tag by wire or wirelessly. The user terminal 110 is configured to read out the item data from the RFID tag attached to the distributed item IMd (see S121 in FIG. 4), and transmit it to the data management server 60 along with the user information such as the location data and the reference request.

By using RFID, the scanner 17 can remotely read the item data even in a situation where the RFID tag is not visible, for example. Further, by repeatedly rewriting the hash value that is the item data, printing and pasting the two-dimensional code can be omitted.

Further, the two-dimensional code may be used in a part of the supply chain SC, and the RFID tag may be used in the remaining parts. The RFID tag is attached to the incoming item IMi, and the two-dimensional code is attached to the distributed item IMd. Moreover, both the two-dimensional code and the RFID tag may be attached to the item. Further, a storage medium different from the two-dimensional code and the RFID tag may be distributed as the medium for recording the hash value and the IP address together with the item.

In a second modification example of the above-described embodiment, the attachment of the supplemental information to the providing data transmitted to the user terminal 110 is omitted. In a third modification example of the above-described embodiment, regardless of the contents of the user information, supplemental information set in advance is transmitted to the user terminal 110 along with the providing data. As described in the second and third modification examples, the incentive for encouraging the user EU to provide the location data may be changed.

In the above-described embodiment, the copied item determination process (see FIG. 5) is performed as a sub-process of the reference process when the reference request is made. In contrast, in a fourth modification example of the above-described embodiment, the copied item determination process is performed at regular interval, for example, independently from the reference process. According to the above, the calculation load of the reference process is reduced, and the providing data can be quickly transmitted to the user EU. The logic for determining the anomaly in the copied item determination process can be changed.

The traceability checker application of a fifth modification example of the above-described embodiment is not configured to perform the providing data setting process (see FIG. 6). The user terminal 110 of the fifth modification example acquires the permission of the user EU by notifying the provision of the location data when the traceability checker application is installed or when the reference request is transmitted. According to the above, it is possible to save the trouble of the user EU regarding the initial setting of the allowed data.

A data management server 60 of a sixth modification example of the above-described embodiment does not have the data analysis function. As in the sixth modification example, a server device managed by a company other than the manufacturer may perform the data analysis for improving the value of the location data such as the analysis of the business region.

Further, the data management server 60 and the timestamp server 90 may be physically managed by the manager of the supply chain SC or the system supplier in an on-premises manner. The data management server 60 and the timestamp server 90 may be provided in the cloud to be used by the manager of the supply chain SC or the system supplier.

In a seventh modification example of the above-described embodiment, the update process of the history information in which the location data is added to the trading records ReT is omitted (see S178 in FIG. 4). In an eighth modification example of the above-described embodiment, the location data is added to the trading records ReT. In contrast, the user information added to the history information after the distribution to the market is excluded from the target disclosed in response to the reference request, and it is not included in the providing data. As a result, the information on the end user is not disclosed to the other end users, and is referenced only to the manufacturers or the retailers with administrator privileges. Since the range of the disclosure of the collected user information is limited, the user information can be collected easily from the market.

The location data transmitted from the user terminal 110 to the data management server 60 is not limited to the measured data such as GPS (Global Positioning System) data. For example, data such as address input by the user EU may be transmitted as the location data. The location data may be specified by the data management server 60 based on the MAC address of the Wi-Fi device, the location information of the base station, the address of the provider associated with the IP address, and the like. Further, the location data provided by the other users EU may be a part of the location data accumulated as the history information. Specifically, the location data is disclosed to the extent that the prefecture or municipality can be identified, and detailed location data that identifies the residence of the other users EU is not disclosed.

In a ninth modification example of the above-described embodiment, the trading records ReT are accumulated in the history database 75 without using the blockchain. For example, the trading records ReT may be protected by techniques other than the blockchain as long as the security of the data management server 60 is ensured.

In a tenth modification example of the above-described embodiment, the transmission of the providing data to the user terminal 110 is canceled when it is determined that the item may be possibility a copied item. As a result, the GUI screen 130 does not transition from the copied item notification screen to the data display screen. In the tenth modification example, the GUI screen 130 transitions to the anomaly screen (see FIG. 7) when the copied item warning window 138 of the copied item notification screen is tapped.

As described above, the item whose trading record ReT can be referred is not limited to the distributed item IMd that is the final product. For example, a module supplier may refer to the trading records ReT of the delivered item IMi using the item code QRi attached to the delivered item IMi.

In order to enable such reference, the supplier terminal 10 may be provided with a function of referring to the trading record ReT.

A person other than the end user may provide the history information of the distributed item IMd to the data management server 60. For example, in an eleventh modification example of the above-described embodiment, maintenance history and parts replacement history at a dealer is transmitted from the terminal to the data management server 60 along with the location data after the vehicle as the distributed item IMd is passed to the end user. The data management server 60 adds a block based on new history information to the blockchain generated when the vehicle is manufactured. Accordingly, the maintenance history and parts replacement history at the dealer can be referred by the reference request.

In a twelfth modification example of the above-described embodiment, the location data of the export place and the import place is transmitted to the data management server 60 by a trader or the like that imports/exports the distributed item IMd. By accumulating such history information, it becomes possible to grasp, for example, the current location of vehicles and home appliances resold overseas, and the distribution channel to the current location.

The final product provided through the supply chain SC is not limited to the industrial product as described above. For example, when the final product is an agricultural product or a grocery product, the consumer who is the end user can refer from the distributed item code QRd attached to the final product to, at the retail store, a series of history information related to the land of production, the producer, inspection items, and inspection organization. Similarly, when the final product is a marine product, the consumer can refer, from the distributed item code QRd attached to the final product, to a series of history information related to country of origin, economic zone, landing ports, fisheries, aquaculture areas, aquaculture companies, inspection items and inspection organizations.

Such applications will improve consumer confidence in the safety of food products and provide reliable proof that the products are fair trade. In addition, the provision of the history information on foodstuffs is very useful for people who need to avoid certain foodstuffs due to religious discipline (halal certification, etc.), allergies, etc., as well as vegetarians, vegans, etc.

If the distributed item code QRd is attached to foodstuffs, flowers (bouquets, etc.), medicines, home appliances, etc., the purchaser of these distributed items or the recipient of these distributed items as a gift can refer to the harvest location, manufacturing location, date and time, and vendor as the history information. In addition, if additional information on how to consume, usages, precautions, names, and how to grow the distributed item is provided, it could facilitate the collection of the location data from purchasers and recipients.

Further, when the distributed item code QRd is attached to medicines, the trading records ReT accumulated in the pharmaceutical process can be referred. Furthermore, according to the implementation of notifications based on the determination of the copied item, it is possible to reduce the risk of accidentally taking a counterfeit drug that contains ingredients different from those of the legitimate product.

The hash function used in the supply chain management system 100 may be a cryptographic hash function and has characteristics as follows: the cryptographic hash function does not output the same hash value in response to different inputs thereto; and the input cannot substantially be estimated from the output hash value. For example, instead of the SHA-256, another encryption algorithm such as SHA-1, SHA-2, and SHA-3 may be appropriately used according to the required output length (number of bits).

In the above embodiments, the respective functions provided by data management server and the timestamp server can be also provided by software and hardware for executing the software, only software, only hardware, and complex combinations of software and hardware. Similarly, each function provided by the control circuits of the supplier terminal and the user terminal can be provided by software and hardware for executing the software, only software, only hardware, or a complex combination of the hardware and the software. In cases where these functions are provided by electronic circuits as hardware, the respective functions can be also provided by analog circuits or digital circuits which include a large number of logic circuits.

In the aforementioned embodiments, the respective processers may include at least one operational core, such as a CPU (Central Processing Unit) or a GPU (Graphics Processing Unit). The processor may further include a field-programmable gate array (FPGA) and an IP core having other dedicated functions.

The form of the storage medium (non-transitory tangible storage medium) employed as each storage part of the above embodiment and storing each program related to the information processing method of the present disclosure may be changed as appropriate. For example, the storage medium is not limited to the configuration provided on the circuit board, and may be provided in the form of a memory card or the like. The storage medium may be inserted into a slot portion, and electrically connected to the computer bus. The storage medium may be also constituted by an optical disk which forms a source of programs to be copied into a computer, a hard disk drive therefor, and the like.

The control unit and the method thereof which have been described in the present disclosure may be also implemented by a special purpose computer which includes a processor programmed to execute one or more functions implemented by computer programs. Alternatively, the control unit and the control method described in the present disclosure may be implemented by a special purpose hardware logic circuit. Alternatively, the control unit and the control method described in the present disclosure may be implemented by one or more special purpose computers configured by a combination of a processor executing a computer program and one or more hardware logic circuits. The computer program may be stored, as instructions to be executed by a computer, in a tangible non-transitory computer-readable medium.

What is claimed is:

1. A method, for a computer, of processing information related to a distributed item, the method comprising:
   generating, by at least one processor, attachment information that is associated with history information accumulated for the distributed item and is to be distributed along with the distributed item; and
   acquiring, by the at least one processor, (i) a reference request from a requester terminal for a reference to the history information using the attachment information attached to the distributed item and (ii) requester information containing at least location data of the requester terminal that made the reference request;
   transmitting the acquired requester information to a data management device to accumulate the requester information in a history database of the data management device;
   detecting, by the at least one processor, a plurality of reference requests from different requesters for the distributed item within a predetermined time, the plurality of reference requests from different requesters being determined based on the location data of the requester terminal;
   comparing, by the at least one processor, the number of the plurality of reference requests received in the predetermined time from different requesters to a threshold; and
   determining, by the at least one processor, the existence of an anomaly and that the distributed item is a duplicated item in response to determining that the number of the plurality of reference requests received in the predetermined time is equal to or greater than the threshold.

2. The method according to claim 1, further comprising:
   providing, as a response to the reference request along with the history information identified from the attachment information, supplemental information related to the distributed item to which the attachment information is attached.

3. The method according to claim 2, wherein
   in the providing the supplemental information, contents of the supplemental information provided to the requester terminal are changed based on contents of the requester information acquired from the requester terminal.

4. The method according to claim 1, further comprising:
   determining that a duplicated item was reproduced from the distributed item based on a plurality of the location data acquired along with the reference requests for the distributed item.

5. The method according to claim 4, wherein
   determining that the duplicated item was reproduced from the distributed item based on a predetermined number of the reference requests along with different location data being acquired within a predetermined time.

6. The method according to claim 1, wherein
   in the acquiring, data that a user of the requester terminal allowed to provide is acquired as the requester information.

7. The method according to claim 1, further comprising:
   generating, using a plurality of the location data acquired along with the reference requests for distributed items of a specific type, business region data that indicates a distribution area of the distributed items of the specific type, the business region data visualizing movement of the distributed items; and
   outputting the business region data as an image data or video data including map data to a display device or an external electronic device.

8. The method according to claim 1, further comprising:
   adding the location data acquired along with the reference request to the history information of the distributed item for which the reference request was made.

9. The method according to claim 1, wherein
   the history information is stored using a blockchain, and the attachment information contains a hash value generated using a block of the blockchain.

10. An information processing device configured to process information related to a distributed item, the information processing device comprising:
    a non-transitory computer-readable storage medium; and a set of computer-executable instructions stored on the non-transitory computer-readable storage medium that, when executed by at least one processor, cause the processor to:
store history information accumulated for the distributed item so as to be associated with attachment information that is generated to be distributed along with the distributed item;
acquire (i) a reference request for a reference to the history information using the attachment information attached to the distributed item and (ii) requester information containing at least location data of a requester terminal that made the reference request;
transmit the acquired requester information to a data management device to accumulate the requester information in a history database of the data management device;
detect a plurality of reference requests from different requesters for the distributed item within a predetermined time, the plurality of reference requests from different requesters being determined based on the location data of the requester terminal;
compare the number of the plurality of reference requests received in the predetermined time from different requesters to a threshold; and
determine the existence of an anomaly and that the distributed item is a duplicated item in response to determining that the number of the plurality of reference requests received in the predetermined time is equal to or greater than the threshold.

11. A non-transitory computer-readable medium storing a computer program for processing information related to a distributed item, the computer program comprising instructions configured to, when executed by at least one processor, cause the processor to:
acquire reference request for a reference to a history information of the distributed item using attachment information that is associated with the history information accumulated for the distributed item and is configured to be distributed along with the distributed item;
acquire, along with the reference request, requester information that contains at least location data of a requester terminal that made the reference request;
transmit the acquired requester information to a data management device to accumulate the requester information in a history database of the data management device;
detect a plurality of reference requests from different requesters for the distributed item within a predetermined time, the plurality of reference requests from different requesters being determined based on the location data of the requester terminal;
compare the number of the plurality of reference requests received in the predetermined time from different requesters to a threshold; and
determine the existence of an anomaly and that the distributed item is a duplicated item in response to determining that the number of the plurality of reference requests received in the predetermined time is equal to or greater than the threshold.

12. The method according to claim 1, further comprising:
determining that a duplicated item was reproduced from the distributed item based on a plurality of the location data acquired along with the reference requests for the distributed item,
wherein
based on determining that the duplicated item has been produced, the acquired location data is stored in a status as duplicated item information, the status being different from a status in a case where it is determined to be an authenticate item.

13. The method according to claim 2, further comprising:
determining that a duplicated item was reproduced from the distributed item based on a plurality of the location data acquired along with the reference requests for the distributed item,
wherein
based on determining that the duplicated item has been produced, the acquired location data is stored in a status as duplicated item information, the status being different from a status in a case where it is determined to be an authenticate item.

14. The method according to claim 1, wherein
the at least one processor is connected with a memory storing a program, and
the generating of the attachment information and the acquiring of (i) the reference request and (ii) the requester information are performed by a data management server.

15. The method according to claim 1, further comprising:
determining, based on a plurality of the location data acquired along with the reference requests for the distributed item, whether a duplicated item reproduced from the distributed item was produced,
wherein
the location data and an acquisition time when the location data has been acquired are stored in the history database in a state linked to each other,
in the determining, the location data and the acquisition time are loaded from the history database in a state in which the location data and the acquisition time are associated with each other, and it is determined whether a plurality of location data acquired within a predetermine period of time are different with each other, and it is decided that the duplicated item was produced.

16. The method according to claim 1, further comprising:
physically attaching the attachment information to the distributed item.

* * * * *